(12) United States Patent
Kim et al.

(10) Patent No.: US 10,008,890 B2
(45) Date of Patent: Jun. 26, 2018

(54) ROTOR AND ELECTRIC MOTOR INCLUDING THE SAME

(71) Applicant: SAMSUNG ELECTRONICS CO., LTD., Suwon-si (KR)

(72) Inventors: Won-Ho Kim, Hwaseong-si (KR); Seong-Taek Lim, Suwon-si (KR); Jin-Woo Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 13/971,241

(22) Filed: Aug. 20, 2013

(65) Prior Publication Data
US 2014/0054998 A1 Feb. 27, 2014

(30) Foreign Application Priority Data
Aug. 21, 2012 (KR) .......................... 10-2012-0091330

(51) Int. Cl.
*H02K 1/27* (2006.01)
*H02K 21/24* (2006.01)
*H02K 16/04* (2006.01)

(52) U.S. Cl.
CPC ............ *H02K 1/27* (2013.01); *H02K 1/2753* (2013.01); *H02K 1/2793* (2013.01); *H02K 16/04* (2013.01); *H02K 21/24* (2013.01)

(58) Field of Classification Search
CPC ........ H02K 1/27; H02K 1/2793; H02K 21/24; H02K 1/2753; H02K 16/04

(Continued)

(56) References Cited

U.S. PATENT DOCUMENTS

| 8,053,942 B2 | 11/2011 | Abe et al. |
| 2010/0141075 A1* | 6/2010 | Atarashi ............... H02K 21/24 |
| | | 310/156.35 |

(Continued)

FOREIGN PATENT DOCUMENTS

| JP | 2001136721 A * 5/2001 |
| JP | 2008141861 A * 6/2008 |

(Continued)

OTHER PUBLICATIONS

Takahiko Miura, "A Ferrite Permanent Magnet Axial Gap Motor with Segmented Rotor Structure for the Next Generation Hybrid Vehicle".*

(Continued)

*Primary Examiner* — Joshua Benitez Rosario
*Assistant Examiner* — Alexander Moraza
(74) *Attorney, Agent, or Firm* — Sughrue Mion, PLLC

(57) ABSTRACT

A rotor and an electric motor including the rotor are provided. The electric motor includes a rotor and a plurality of stators. The rotor includes a plurality of main magnets that are disposed spaced apart from each other along a circumferential direction with respect to a rotation axis of the rotor, and have a magnetizing direction that is a direction of the rotation axis, a plurality of auxiliary magnetic units that are disposed on both sides of each of the main magnets in the direction of the rotation axis, and have a magnetizing direction that is the circumferential direction, so as to concentrate magnetic flux in each of the main magnets, and a plurality of webs that are disposed between the auxiliary magnetic units so as to generate a reluctance torque.

11 Claims, 5 Drawing Sheets

(58) Field of Classification Search
USPC .............. 310/156.07, 156, 156.31–156.37,
310/156.54–156.55, 156.43, 156.49,
310/156.48, 156.62, 156.64, 156.65,
310/156.25
See application file for complete search history.

(56) References Cited

U.S. PATENT DOCUMENTS

| | | | | |
|---|---|---|---|---|
| 2010/0231079 | A1* | 9/2010 | Abe et al. ................ | 310/156.35 |
| 2011/0285237 | A1* | 11/2011 | Amari et al. ............ | 310/156.07 |
| 2013/0057102 | A1* | 3/2013 | Yamada ................... | H02K 1/27 |
| | | | | 310/156.07 |

FOREIGN PATENT DOCUMENTS

| JP | 2008-167639 A | 7/2008 |
|---|---|---|
| JP | 2009-60678 A | 3/2009 |
| JP | 2010-93972 A | 4/2010 |
| JP | 2010098929 A * | 4/2010 |
| JP | 2010-110163 A | 5/2010 |
| JP | 2011-78202 A | 4/2011 |

OTHER PUBLICATIONS

JP2001136721A (English Translation).*
Miura (A Ferrite Permanent Magnet Axial Gap Motor with Segmented Rotor Structure for the Next Generation Hybrid Vehicle), 2010.*
http://www.merriam-webster.com/dictionary/overlap.*
Naito (JP 2010098929 A, English Translation), Pub: Apr. 2010.*
JP2008141861A (English translation).*
Miura, et al., "A Ferrite Permanent Magnet Axial Gap Motor with Segmented Rotor Structure for the Next Generation Hybrid Vehicle", XIX International Conference on Electrical Machines, ICEM 2010 (Sep. 6-8, 2010), Rome, 978-1-4244-4175-4/10, Total 6 pages.
Communication dated May 14, 2018, issued by the Japanese Patent Office in counterpart Japanese Patent Application No. 10-2012-0091330.

* cited by examiner

ROTOR AND ELECTRIC MOTOR INCLUDING THE SAME

CROSS-REFERENCE TO RELATED APPLICATION

This application claims priority from Korean Patent Application No. 10-2012-0091330, filed on Aug. 21, 2012, the entire disclosure of which is incorporated herein by reference for all purposes.

BACKGROUND

1. Field

The following description relates to an electric motor that is used for converting electrical energy into mechanical energy in a variety of fields, such as electric vehicles, home appliances, and the like.

2. Description of the Related Art

Electric vehicles using an electric motor as a power source have gained more popularity due to harmful environmental effects from air pollution and the depletion of fossil fuels. Electric vehicles are may be classified as pure electric vehicles and hybrid electric vehicles. Pure electric vehicles are vehicles that use only an electric motor as a main power source. Hybrid electric vehicles are vehicles that use an internal combustion engine as a main power source, and an electric motor as an auxiliary power source. Electric vehicles are designed for the purposes of high torque at a low speed, high-speed operation, lightweight, etc. In order to achieve these purposes, power density of an electric motor, adopted in electric vehicles, is considered to be important. Electric vehicles may have an in-wheel system. The in-wheel system is a system in which an electric motor is mounted in an inner space of the wheel, so as to directly transmit power of the electric motor to the wheel.

In the in-wheel system, a brake, a bearing for supporting a hub, etc., are installed in the inner space of the wheel, and the electric motor is mounted in the remaining inner space. Accordingly, the electric motor needs to have a structure for improving output density, and a thin structure for having a short axial length, in order to avoid interference with a vehicle body.

The electric motor is also used in other applications, such as home appliances, etc. For example, a direct drive washing machine may have a structure in which an electric motor is connected to a tub. In order to minimize a space of the tub which protrudes backward due to the electric motor in the washing machine, the electric motor needs to have a thin structure for having a short axial length. In addition, since the washing machine needs a high torque at a low speed, high-speed operation, etc., output density of the electric motor, adopted in the washing machine, needs to be improved.

SUMMARY

According to an aspect of an exemplary embodiment, there is provided a rotor including: a plurality of main magnets that are disposed spaced apart from each other along a circumferential direction with respect to a rotation axis of the rotor, and have a magnetizing direction that is a direction of the rotation axis; a plurality of auxiliary magnetic units that are disposed on both sides of each of the main magnets in the direction of the rotation axis, and have a magnetizing direction that is the circumferential direction, so as to concentrate magnetic flux in each of the main magnets; and a plurality of webs that are disposed between the auxiliary magnetic units so as to generate a reluctance torque.

According to an aspect of another exemplary embodiment, there is provided an electric motor including: a rotor including a plurality of main magnets that are disposed spaced apart from each other along a circumferential direction with respect to a rotation axis of the rotor, and have a magnetizing direction that is a direction of the rotation axis, a plurality of auxiliary magnetic units that are disposed on both sides of each of the main magnets in the direction of the rotation axis, and have a magnetizing direction that is the circumferential direction so as to concentrate magnetic flux in each of the main magnets, and a plurality of webs that are disposed between the auxiliary magnetic units so as to generate a reluctance torque; and stators that are disposed so that there is an air gap between each of the stators and front and rear sides of the rotor in the direction of the rotation axis.

BRIEF DESCRIPTION OF THE DRAWINGS

The above and/or other aspects will become more apparent and readily appreciated from the following description of exemplary embodiments, taken in conjunction with the accompanying drawings, in which.

Figure 1:
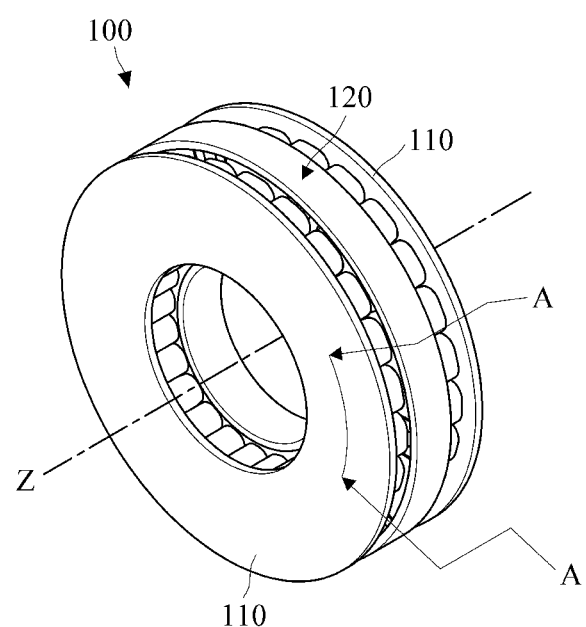
FIG. 1 is a perspective view showing an electric motor according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

Figure 2:
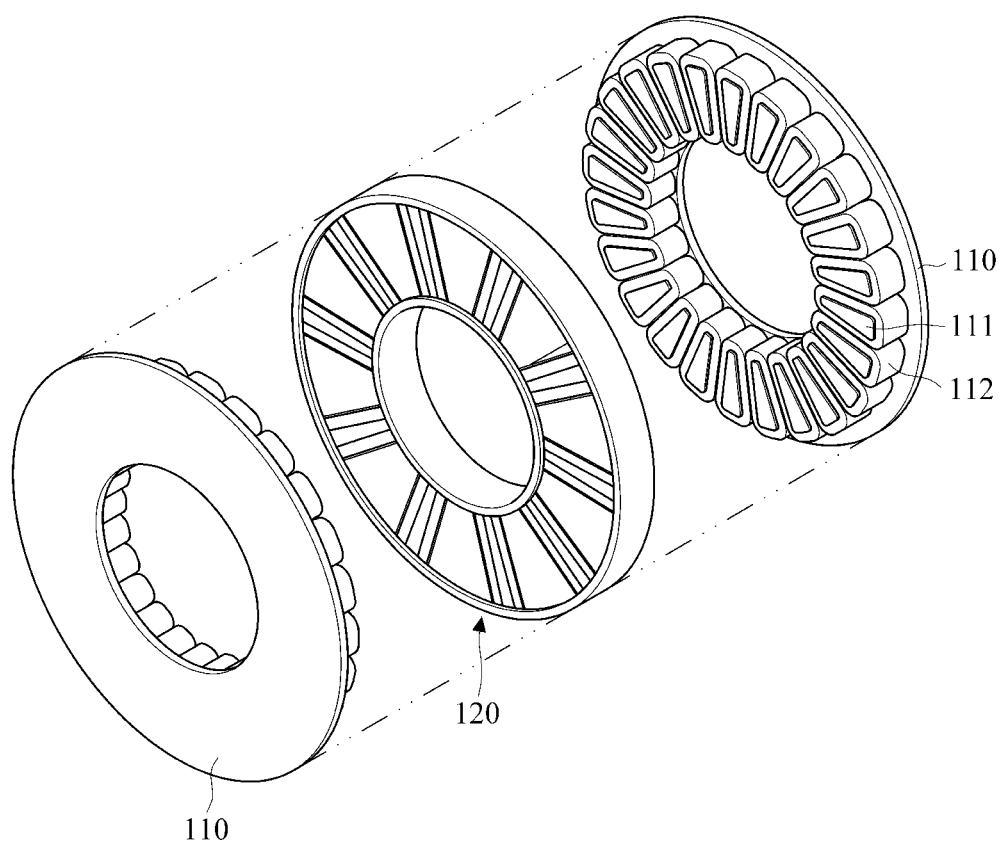
FIG. 2 is an exploded perspective view of the electric motor of FIG. 1.
Figure 3:
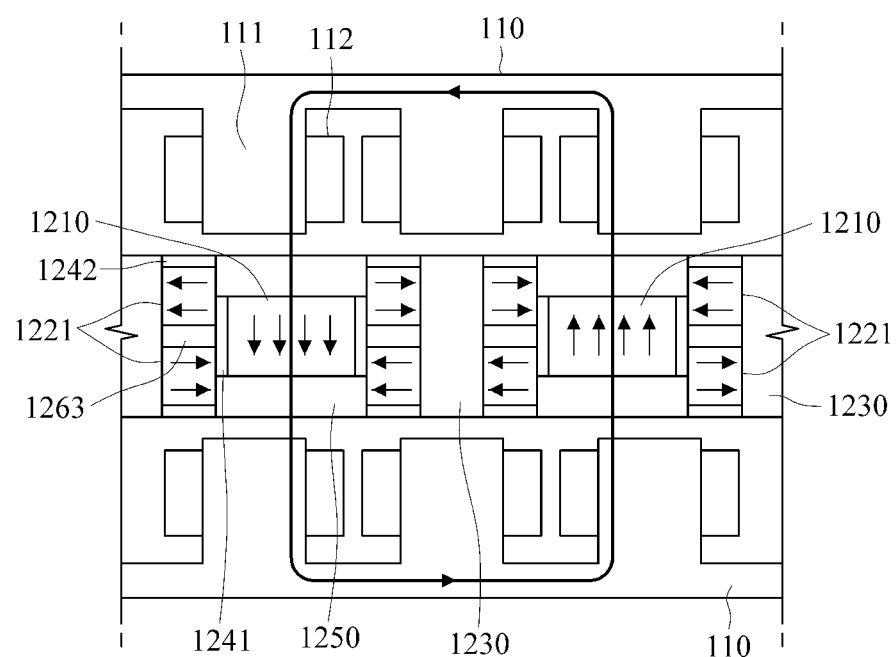
FIG. 3 is a cross-sectional view taken along line A-A of FIG. 1.
Figure 4:
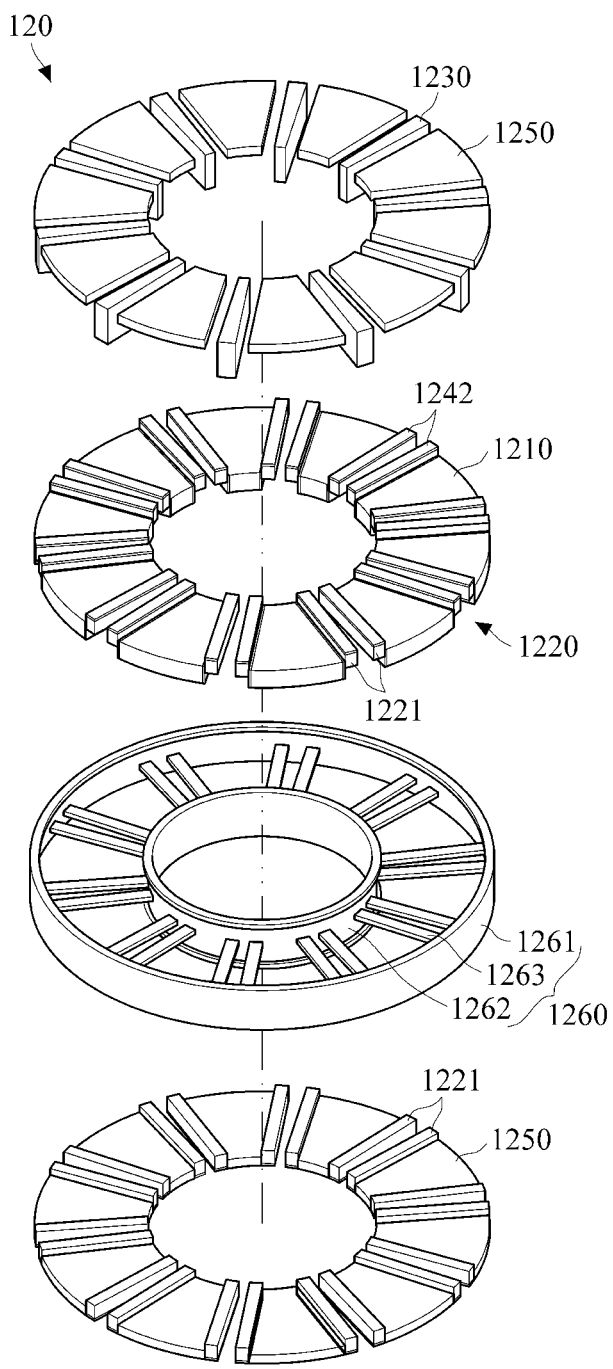
FIG. 4 is an exploded perspective view of a rotor of the electric motor of FIG. 2.

FIG. 1 is a perspective view showing an electric motor according to an exemplary embodiment, FIG. 2 is an exploded perspective view of the electric motor of FIG. 1, FIG. 3 is a cross-sectional view taken along line A-A of FIG. 1, and FIG. 4 is an exploded perspective view of a rotor of the electric motor of FIG. 2.

Referring to FIGS. 1 to 4, an electric motor 100 includes stators 110 and a rotor 120.

The stators 110 are disposed to have an air gap between each of the stators 110 and the rotor 120, on front and rear sides of the rotor 120 in the direction of the rotation axis Z of the rotor 120.

Each of the stators 110 may have a disc shape with a hollow center.

The hollow center of the stator 110 enables a shaft (not shown) fixed in a center of the rotation of the rotor 120 to pass there through.

Each of the stators 110 may have a plurality of teeth 111 formed on each surface facing the rotor 120 along a circumferential direction. Further, in each of the stators 110, slots are formed between the teeth 111. In addition, in each of the stators 110, coils 112 may be provided so as to wrap around each of the teeth 111.

When a current flows in the coils 112 of the stators 110, the stators 110 may generate a rotating magnetic field for rotating of the rotor 120.

The stators 110 may be pairs having the same shape.

The rotor 120 includes main magnets 1210, auxiliary magnetic units 1220, and webs 1230. The main magnets 1210 are arranged so as to be spaced apart from each other in a circumferential direction with respect to the rotation axis Z. Each of the main magnets 1210 may include a permanent magnet having a magnetizing direction that is the direction of the rotation axis Z. For example, the main magnets 1210 are provided as even pieces, and arranged at regular intervals. A magnetizing direction of the odd-numbered main magnets 1210 and a magnetizing direction of the even-numbered main magnets 1210 may be set to be opposite to each other.

The auxiliary magnetic units 1220 may be disposed on both sides of each of the main magnets 1210 in the direction of the rotation axis Z, and include a permanent magnet having a magnetizing direction that is a circumferential direction.

The auxiliary magnetic units 1220 concentrate magnetic flux of the main magnet 1210. For example, each of the auxiliary magnetic units 1220 may include two auxiliary magnets 1221 that are spaced apart from each other in the direction of the rotation axis Z. Accordingly, four auxiliary magnets 1221 may be divided into two on both sides of a single main magnet 1210. The magnetizing direction of the auxiliary magnets 1221 may be set as shown in FIG. 3.

As shown in FIG. 3, the left main magnet 1210 is set to have a downward magnetizing direction, and the right main magnet 1210 is set to have an upward magnetizing direction. In this case, the upper left and right auxiliary magnets 1221, among the four auxiliary magnets 1221 which are disposed on both sides of the left main magnet 1210, may be set to have a magnetizing direction in which the upper left and right auxiliary magnets 1221 are laterally spaced away from each other, and the lower left and right auxiliary magnets 1221 may be set to have a magnetizing direction in which the lower left and right auxiliary magnets 1221 laterally approach each other. In addition, among the four auxiliary magnets 1221 which are disposed on both sides of the right main magnet 1210, the upper left and right auxiliary magnets 1221 may be set to have a magnetizing direction in which the upper left and right auxiliary magnets 1221 laterally approach each other, and the lower left and right auxiliary magnets 1221 may be set to have a magnetizing direction in which the lower left and right auxiliary magnets 1221 are laterally spaced away from each other. Thus, magnetic flux of the left and right main magnets 1210 may be concentrated by the auxiliary magnets 1221, disposed in each of the left and right main magnets 1210, to flow in the counter-clockwise direction. Therefore, the magnetic flow is interlinked with the coils 112 of the stator. As a result, a magnetic attracting force between the rotor 120 and the stators 110 is increased, resulting in an increase in magnetic torque.

In order to increase the effect of concentrating the magnetic flux of the main magnets 1210 by the auxiliary magnets 1221, the auxiliary magnets 1221 may be formed so as to be overlapped with the main magnets 1210.

The webs 1230 are inserted between the auxiliary magnetic units 1220 so as to generate a reluctance torque. Reluctance torque is a torque that is generated by characteristics of a magnetic substance. The magnetic substance is arranged in a direction in which magnetic reluctance of a magnetic circuit in a magnetic field is a minimum. The web may be made of a material having relatively low magnetic reluctance, e.g., iron, etc.

The webs 1230 increase a q-axis inductance. Specifically, a q-axis magnetic circuit is formed between the adjacent webs 1230. A magnetic reluctance of the q-axis magnetic circuit is reduced by the webs 1230. Therefore, the q-axis inductance may be increased. When the q-axis inductance is increased, reluctance torque may be increased. Torque of an electric motor may be calculated according to Equation 1 as follows.

$$T = P_n\{\Psi_a i_q + (L_d - L_q)i_d i_q\} \qquad \text{[Equation 1]}$$
$$= T_m + T_r$$

In Equation 1, T denotes a torque, $P_n$, denotes a pole pair, $\Psi_a$ denotes a no-load flux-linkage, $i_d$ denotes a d-axis current, $L_d$ denotes a d-axis inductance, $i_q$ denotes a q-axis current, and $L_q$ denotes a q-axis inductance.

On the right hand side of Equation 1, $P_n \times \Psi_a \times i_q$ denotes a magnetic torque $T_m$, and $P_n \times (L_d - L_q) \times i_d \times i_q$ denotes a reluctance torque $T_r$.

In general, q-axis inductance $L_q$ is larger than d-axis inductance $L_d$. Since q-axis inductance $L_q$ is larger than d-axis inductance $L_d$, $(L_d - L_q)$ has a negative value. Since d-axis current $i_d$ is a negative value and q-axis current $i_q$ is a positive value, the reluctance torque $T_r$ has a positive value. When the q-axis inductance $L_q$ is increased by the webs 1230, $(L_d - L_q)$ is increased. As a result, reluctance torque $T_r$ may be increased.

As described above, since the magnetic torque $T_m$ is increased by the auxiliary magnetic units 1220 and the reluctance torque $T_r$ is generated by the webs 1230, the overall torque T of the electric motor may be increased. Accordingly, an output of the electric motor 100 may be increased. In addition, the rotor 120 may have a thin structure in which a length of the direction of the rotation axis Z is relatively short. Therefore, output density of the electric motor 100 may be improved.

The webs 1230 may by-pass magnetic fluxes of the stators 110, which flow to the permanent magnet of the rotor 120, e.g., the main magnets 1210 and the auxiliary magnets 1221. Therefore, irreversible demagnetization of the permanent magnet is prevented.

In order to prevent irreversible demagnetization of the permanent magnet, a first non-magnetic substance 1241 may be inserted between the auxiliary magnets 1221 and the main magnets 1240. In addition, a second non-magnetic substance 1242 may be disposed on surfaces opposite to surfaces of the auxiliary magnets 1221, which are spaced apart from each other, i.e., surfaces exposed to the air gap.

The rotor 120 may include pole pieces 1250. The pole pieces 1250 may be disposed on front and rear surfaces of each of the main magnets 1210 with respect to the rotation axis Z.

The pole pieces 1250 may prevent scattering of the main magnets 1210. In addition, the pole pieces 1250 may be made of a magnetic material.

The webs 1230 may be made of a material having a lower magnetic reluctance than the pole piece 1250, e.g., iron, etc., in order to achieve the above-described function.

The pole pieces 1250 may be inserted into a limited space between the main magnets 1210 and the auxiliary magnets 1221. The pole pieces 1250 may have the same size as a size of the limited space between the main magnets 1210 and the auxiliary magnets 1221.

When the second non-magnetic substance 1242 is disposed in the auxiliary magnet 1221, the pole piece 1250 may have a size that is increased by a thickness corresponding to the second non-magnetic substance 1242. Accordingly, the pole piece 1250 and the second non-magnetic substance 1242 may be placed on the same plane as a surface facing the stator 110.

The rotor 120 may include a frame 1260. The frame 1260 supports the main magnets 1210, the auxiliary magnets 1221, the webs 1230, and the pole pieces 1250. As an example, the frame 1260 may include an outer rim 1261, an inner rim 1262, and spokes 1263.

The outer rim 1261 may be formed along outer peripheries of the pole pieces 1250 and the webs 1230, and support the pole pieces 1250 and the webs 1230, so as to wrap around outer portions of the pole pieces 1250 and the webs 1230.

The inner rim 1262 may be formed along inner peripheries of the pole pieces 1250 and the webs 1230, and support the pole pieces 1250 and the webs 1230 so as to wrap around inner portions of the pole pieces 1250 and the webs 1230.

Figure 5:
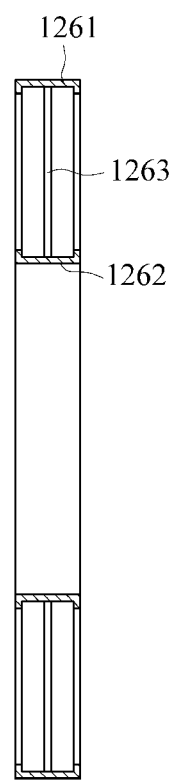
FIG. 5 is a cross-sectional view showing a frame of FIG. 4.

For example, as shown in FIG. 5, the outer rim 1261 may have a shape having a substantially U-shaped cross section. Accordingly, the outer rim 1261 may support the pole pieces 1250 and the webs 1230, so as to wrap around the outer peripheries and both side surfaces of the pole pieces 1250 and the webs 1230. The outer rim 1261, the main magnets 1210, the auxiliary magnets 1221, and the second non-magnetic substances 1242 may be supported together with the pole pieces 1250 and the webs 1230.

The inner rim 1262 may have a shape with a substantially U-shaped cross section. Accordingly, the inner rim 1262 may support the pole pieces 1250 and the webs 1230, so as to wrap around the inner peripheries and both side surfaces of the pole pieces 1250 and the webs 1230.

Each of the spokes 1263 include an end connected to the outer rim 1261 and the other end connected to the inner rim 1262. The spokes 1263 are inserted between the auxiliary magnets 1221 spaced apart from each other, and maintain intervals between the auxiliary magnets 1221.

The frame 1260 may be made of a non-magnetic substance having hardness.

In the above-described frame 1260, the rotor 120 may be assembled in a fitted manner without a separate fastening mechanism. Therefore, an assembling process may be easy, and a structure of the rotor 120 may be simplified.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rotor comprising:
   a plurality of main magnets that are disposed spaced apart from each other along a circumferential direction with respect to a rotation axis of the rotor, and have a magnetizing direction that is a direction of the rotation axis;
   a plurality of auxiliary magnetic units that are disposed on opposite sides of each of the main magnets in the direction of the rotation axis, and have a magnetizing direction in the circumferential direction, so as to concentrate magnetic flux in each of the main magnets;
   a plurality of webs that are disposed between the auxiliary magnetic units so as to generate a reluctance torque; and
   a plurality of pole pieces disposed on front and rear surfaces of each of the main magnets with respect to the rotation axis,
   wherein a length of a single rectangular main magnet of the plurality of main magnets in the direction of the rotation axis is greater than a gap between two auxiliary magnets of the plurality of auxiliary magnetic units in the direction of the rotation axis and less than a sum of the gap and a length of the two auxiliary magnets in the direction of the rotation axis, the single rectangular main magnet being in contact with a pair of non-magnetic substances and a pair of the plurality of pole pieces, and the length of the single rectangular main magnet being constant in the circumferential direction,
   wherein a plane surface of each of the plurality of pole pieces is disposed to overlap with the plurality of auxiliary magnetic units,
   wherein the overlapped plane surface of at least one of the plurality of pole pieces is disposed below an edge of a surface of the plurality of auxiliary magnetic units, the edge being in contact with the overlapped plane surface of the plurality of auxiliary magnetic units.

2. The rotor according to claim 1, further comprising:
   another non-magnetic substance which has a surface in contact with one of the auxiliary magnets and another surface exposed to an air gap of the rotor.

3. The rotor according to claim 1, wherein each of the webs is made of a material having a magnetic reluctance that is lower than a magnetic reluctance of each of the pole pieces.

4. The rotor according to claim 1, wherein the length of the plurality of main magnets in the direction of the rotation axis is less than a length of the plurality of webs in the direction of the rotation axis.

5. The rotor according to claim 1, further comprising a frame that supports the main magnets, the auxiliary magnets, the webs, and the pole pieces, wherein the frame comprises:
   an outer rim that is formed along outer peripheries of the pole pieces and the webs, and supports the pole pieces and the webs so as to wrap around outer portions of the pole pieces and the webs,
   an inner rim that is formed along inner peripheries of the pole pieces and the webs, and supports the pole pieces and the webs so as to wrap around inner portions of the pole pieces and the webs, and a plurality of spokes that are disposed between the auxiliary magnets, each of the spokes including an end connected to the outer rim and another end connected to the inner rim.

6. An electric motor comprising:

a rotor comprising:

a plurality of main magnets that are disposed spaced apart from each other along a circumferential direction with respect to a rotation axis of the rotor, and have a magnetizing direction that is a direction of the rotation axis;

a plurality of auxiliary magnetic units that are disposed on both sides of each of the main magnets in the direction of the rotation axis, and have a magnetizing direction that is the circumferential direction, so as to concentrate magnetic flux in each of the main magnets;

a plurality of webs that are disposed between the auxiliary magnetic units so as to generate a reluctance torque; and a plurality of pole pieces that are disposed on front and rear surfaces of each of the main magnets with respect to the rotation axis, and a plurality of stators that are disposed so that there is an air gap between each of the stators and front and rear sides of the rotor in the direction of the rotation axis, wherein a length of a single rectangular main magnet of the plurality of main magnets in the direction of the rotation axis is greater than a gap between two auxiliary magnets of the plurality of auxiliary magnetic units in the direction of the rotation axis and less than a sum of the gap and a length of the two auxiliary magnets in the direction of the rotation axis, the single rectangular main magnet being in contact with a pair of non-magnetic substances and a pair of the plurality of pole pieces, and the length of the single rectangular main magnet being constant in the circumferential direction, wherein a plane surface of each of the plurality of pole pieces is disposed to overlap with the plurality of auxiliary magnetic units, and wherein the overlapped plane surface of at least one of the plurality of pole pieces is disposed below an edge of a surface of the plurality of auxiliary magnetic units, the edge being in contact with the overlapped plane surface of the plurality of auxiliary magnetic units.

7. The electric motor according to claim 6, further comprising:

another non-magnetic substance which has a surface in contact with one of the auxiliary magnets and another surface exposed to the air gap.

8. The electric motor according to claim 6, wherein each of the webs is made of a material having a magnetic reluctance that is lower than a magnetic reluctance of each of the pole pieces.

9. The electric motor according to claim 6, wherein the length of the plurality of main magnets in the direction of the rotation axis is less than a length of the plurality of webs in the direction of the rotation axis.

10. The electric motor according to claim 6, further comprising a frame that supports the main magnets, the auxiliary magnets, the webs, and the pole pieces, wherein the frame comprises:

an outer rim that is formed along outer peripheries of the pole pieces and the webs, and supports the pole pieces and the webs so as to wrap around outer portions of the pole pieces and the webs, an inner rim that is formed along inner peripheries of the pole pieces and the webs, and supports the pole pieces and the webs so as to wrap around inner portions of the pole pieces and the webs, and a plurality of spokes that are disposed between the auxiliary magnets, each of the spokes including an end connected to the outer rim and another end connected to the inner rim.

11. The rotor according to claim 1, wherein the plurality of main magnets comprise odd-numbered main magnets and even-numbered main magnets, wherein a magnetizing direction of the odd-numbered main magnets is opposite to a magnetizing direction of the even-numbered main magnets.

* * * * *